United States Patent Office 3,433,306
Patented Mar. 18, 1969

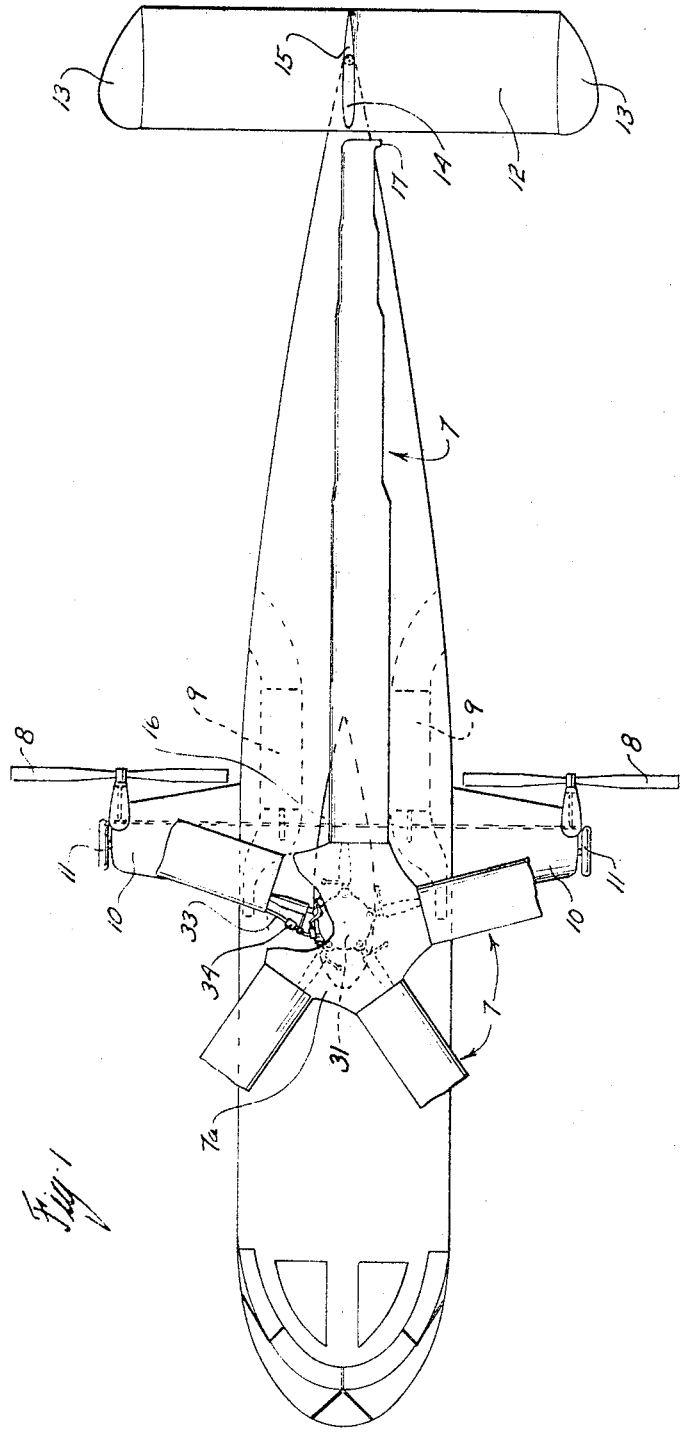

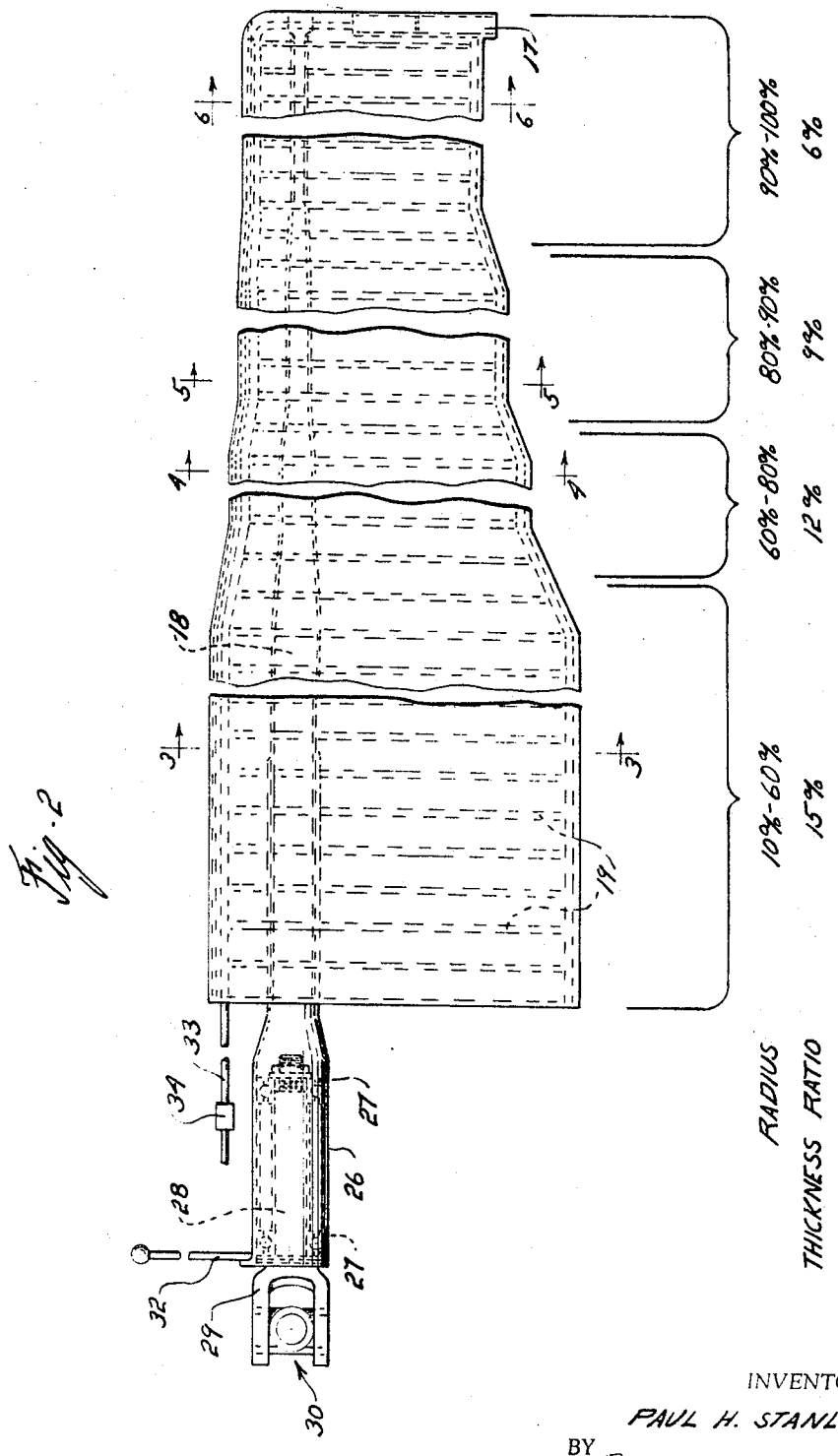

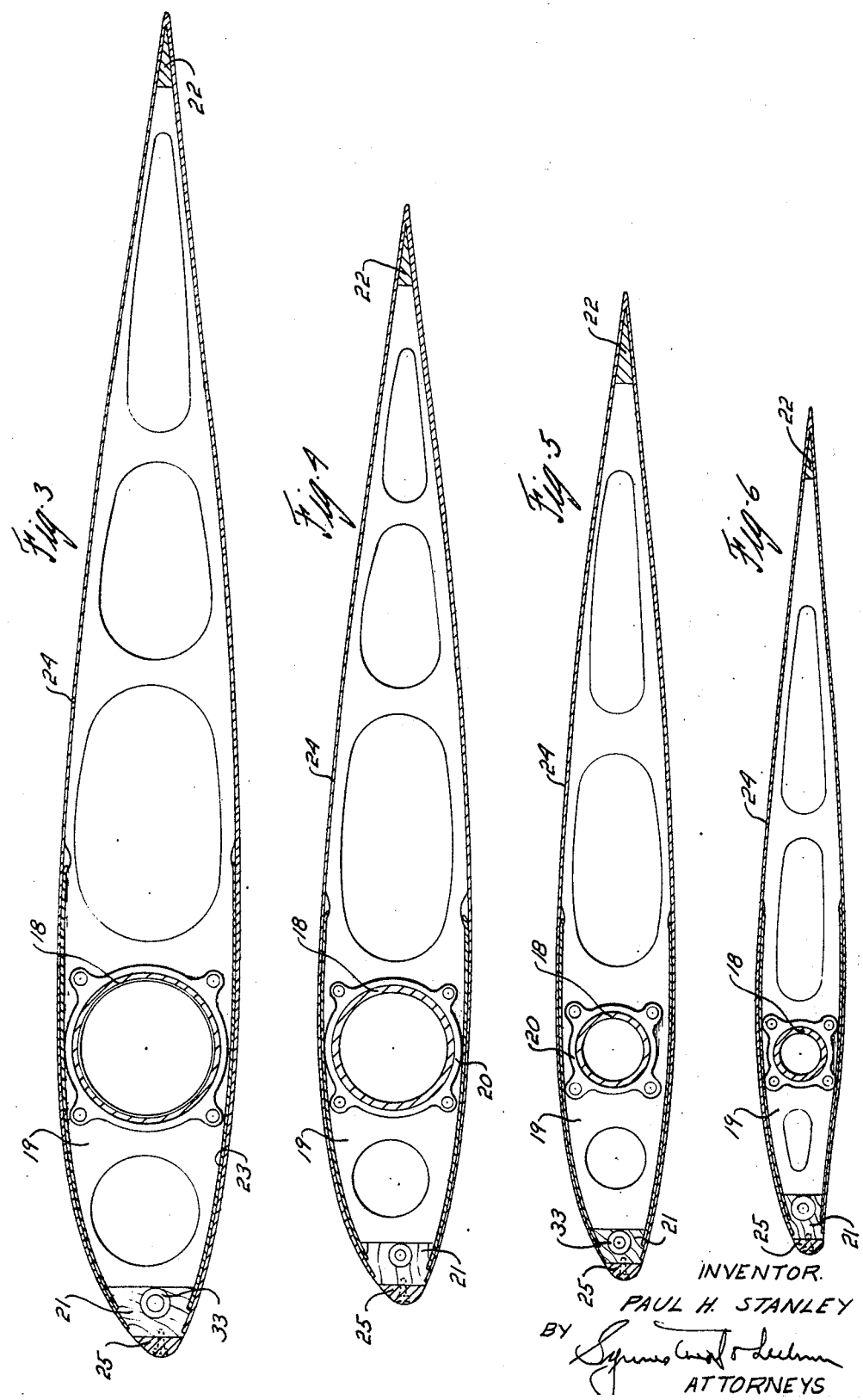

3,433,306
CAMBERED BLADE FOR AIRCRAFT SUSTAINING ROTOR
Paul H. Stanley, Glenside, Pa., assignor to Autogiro Company of America, Jenkintown, Pa., a corporation of Delaware
Filed Oct. 18, 1967, Ser. No. 676,342
U.S. Cl. 170—159         8 Claims
Int. Cl. B64c 27/46, 27/00, 11/00

ABSTRACT OF THE DISCLOSURE

A sustaining rotor blade for rotary wing aircraft having a substantially fixed center of pressure cambered blade section throughout at least most of the outboard portions of the blade, having substantially the same mean camber line throughout the cambered portions of the blade and being of reduced chord dimension and reduced thickness ratio in the tip region of the blade as compared with inboard regions of the cambered portion of the blade.

---

The present invention is concerned with a cambered rotor blade for aircraft sustaining rotors and the blade of the present invention is especially useful in rotary wing aircraft capable of relatively high translational flight speed and having relatively high blade tip speed at least under certain conditions of operation.

One of the principal objectives of the invention is to increase the overall efficiency of rotor blades for aircraft of the kind above referred to.

Another important objective of the present invention is to provide not only for an increase in efficiency of the rotor blade under conditions of high translational flight speed of the aircraft and high rotor tip speed, but at the same time provide a significant increase in efficiency under other operating conditions, notably in vertical flight and hovering, and also in maneuvering. The invention thus achieves increased rotor efficiency under a broad range of operating conditions.

It is a further object of the invention to provide a blade construction which not only attains increase in efficiency but which also has stable operating characteristics.

How the foregoing and other objects and advantages are attained will appear more fully from the following description referring to the accompanying drawings illustrating a preferred embodiment, and in which:

FIGURE 1 is a plan view of a rotary wing aircraft having a sustaining rotor incorporating rotor blades constructed according to the present invention, the view showing one blade in full plan and the other blades of the rotor broken away near the hub;

FIGURE 2 is an enlarged plan view of one of the rotor blades, with portions of the blade broken out, this view also illustrating the blade root mounting arrangements; and FIGURES 3 to 6 inclusive are blade sectional views taken as indicated by the section lines 3—3, 4—4, 5—5, and 6—6 on FIGURE 2.

Although the blades of the present invention are adaptable to any of a number of types of rotary wing aircraft, in FIGURE 1 the blades are illustrated as incorporated in the sustaining rotor of a rotary wing aircraft of the general type disclosed in my copending application Ser. No. 503,536 filed Oct. 23, 1965, now abandoned, and of which a continuation-in-part application was filed on Sept. 12, 1968, under Ser. No. 759,829.

In the aircraft shown in FIGURE 1 the rotor blades are generally indicated by the numeral 7, and it will be seen that there are five such blades in the rotor of that aircraft. The aircraft also includes propulsion means in the form of a pair of airscrews 8 adapted to be driven by means of gas turbine engines 9 disposed within the body of the aircraft, these airscrews being mounted toward the outer ends of out-riggers 10 at an elevation below the plane of rotation of the sustaining blades 7. The outriggers 10 may also serve to mount landing wheels 11. The aircraft is provided with an empenage including horizontal surface 12 having dihedral upturned tips 13 and also having a vertical surface 14 which is trailed by rudder 15.

It will be understood that the sustaining rotor is rotatively mounted through any suitable hub positioned and supported above the body of the aircraft, for instance at the top of the pylon mounting 16.

Although the features of the rotor blades according to the present invention are also useful in sustaining rotor systems which are hub driven, in the embodiment here shown, it is contemplated that the rotor blades and thus the sustaining rotor as a whole be rotatively driven by jet reaction, for which purpose each blade is provided with a blade tip jet device indicated in FIGURE 1 at 17. The arrangement and nature of operation of this blade tip jet is explained more fully hereinafter.

Turning now to the plan view of FIGURE 2 and the sectional views of FIGURES 3–6 inclusive, it will be seen that the blade is built up upon a spar 18 which is step tapered so that the spar diameter is progressively decreased as the tip of the blade is approached. Metal or wood ribs 19 are mounted on and secured to the spar by means of collars 20, nose and trailing strips 21 and 22 also being provided. This skeleton structure of the blade is then covered, for instance by plywood sheets indicated at 23 in the nose region of the blade. A thin plywood covering 24 envelopes the entire blade structure and provides the desired exterior surface for the blade. A ballast weight in the form of a heavy metal strip 25 is mounted at the nose of the blade, being fastened at intervals by screws or the like. This ballast weight may be formed of depleted uranium or a tungsten copper alloy.

At its inner end the spar structure 18 is provided with an enlargement 26 forming a housing for the pitch bearings 27 by means of which the blade is mounted for pitch change motion about the spindle 28 which in turn is provided with a forked inner end 29 cooperating with pivot structure indicated generally at 30 in FIGURE 2 for connecting the blade with the rotative rotor hub member 31 (see FIGURE 1).

The pitch of the rotor blades is adapted to be controlled through the pitch control arm 32 which is connected with operating linkages of well known type which need not be considered in detail herein, although it may be mentioned that it is contemplated that the pitch control system will provide not only for mean rotor blade pitch variation but also for cyclic pitch variation for maneuvering purposes.

Although rotor drive jet arrangements of various kinds may be employed, for instance a blade tip jet supplied with energized gas, such as may be developed in a gas turbine engine, in the particular embodiment here illustrated, the blade tip jet 17 is of the type adapted to burn liquid fuel supplied to it through the supply tube 33 under the control of a valve diagrammatically indicated at 34. This supply line may be connected with a passage formed within the hub structure 31 as is shown in FIGURE 1 in the area in which the blade root fairing 7a is broken out. The tube 33 is formed of flexible material, so as to accommodate swinging motions of the blades in flight operations.

The blades of the present invention are adapted for use in a rotor system which may be jet driven either normally or only for limited phases of operation of the aircraft such as take off and cushioned landings, and regardless of the type of jet drive employed, it is contemplated that the rotor also be capable of autorotative operation. The type of jet drive system employed, and the specific details of the jet device at the blade tip form no part of the present invention per se and therefore need not be considered herein. As hereinabove indicated, the blades of the invention are also usable in an aircraft in which the sustaining rotor is hub driven.

Attention is now directed to certain aspects of the plan form and section of the rotor blade. As seen in FIGURES 1 and 2, the blade is tapered in plan form from a relatively wide chord at the root to a relatively narrow chord at the tip. While the taper could be continuous, in the embodiment illustrated the blade is step tapered, having four panels or portions of different chord dimensions interconnected by short tapered junctions. The step tapered arrangement is of advantage in simplifying fabrication of the blades, because this reduces the total number of different size ribs and the like to be employed.

For various aerodynamic reasons, in the preferred embodiment of such a step tapered blade, it is contemplated that the innermost portion or panel of the blade, which is of the greatest chord dimension, will extend out to about the 60% span or radius point from the center of rotation. In the arrangement illustrated, this innermost panel will thus extend from about the 10% radius point to about the 60% radius point, as is indicated by the bracket associated with FIGURE 2. Similar brackets applied to the figure indicate the three additional blade portions or panels, these being of successively diminishing chord dimension and respectively comprising portions of the blade radius extending from about the 60% to the 80% radius points, from about the 80% to 90% radius points, and from about the 90% radius out to the blade tip.

From the above it will be seen that the stepwise reductions in chord of the outer three panels all occur in about the outer 40% of the blade radius, which comprehends the region in which the spanwise center of pressure of the blade is located. As is well known, under various different operating conditions the spanwise location of the center of pressure of the blade shifts radially between about the 55–60% radius point and the 80% radius point.

The foregoing characteristics of the plan shape of the rotor blade of the present invention should be kept in mind when considering the sectional views of FIGURES 3–6 inclusive which illustrate certain other characteristics of the blade which are advantageously employed in combination with the plan pattern above described.

In the embodiment disclosed, the thickness ratio of the blade in different panels or regions is an important feature of the invention, for reasons which will be explained more fully herebelow. In explaining the sectional contours of the blade it is first mentioned that a blade constructed according to the present invention embodies a progressive reduction in thickness ratio at least throughout the outer 40 or 50% of the blade radius, such progressive reduction being indicated in the embodiment herein disclosed between about the 60% radius point and the blade tip. While the thickness ratio could be continuously reduced, for the sake of simplifying fabrication of the blade, the thickness ratio is reduced in steps corresponding to the step taper in plan form above described.

In the embodiment disclosed, the thickness ratio of the several panels of the blade is indicated in FIGURE 2 in association with the brackets applied to that figure in order to mark off the radius points of the inner and outer ends of each panel. Thus it will be seen that the thickness ratio is diminished from 15% in the inboard portion of the blade to 12% in the panel from 69–80% of the radius, to 9% in the panel from 80–90% of the radius, and to 6% in the panel from 90–100% of the radius. It will be understood that the foregoing values for thickness ratio are given only by way of illustration and that other stepwise or even continuous reductions may be employed as the blade tip is approached.

Attention is now directed to the fact that according to the present invention at least the outer half of the blade has a cambered airfoil section. The inboard half of the blade could be of a substantially symmetrical airfoil section, but preferably all sections of the blade are cambered. Where all sections of the blade are cambered, it is preferred to employ blade sections having the same mean camber line curvature although the successive panels or portions of the blade may be of diminishing chord and reduced thickness ratio as the blade tip is approached. As a preferred example, all blade sections may have the mean camber line of the NACA 230 airfoil.

In addition, according to the invention, the camber of the section is selected so as to have in all the cambered blade sections a substantially constant chordwise center of pressure characteristics, so that the chordwise location of the center of pressure of the blade will not appreciably shift even when the blade experiences large fluctuations in aerodynamic angle of attack.

It is contemplated that the blade section be developed from the NACA 230 mean camber line, on which a streamlined form is superimposed, the streamlined form being of varied thickness ratio corresponding to the streamlined form of FIGURE 1 of NACA Technical Report No. 460.

The chordwise location of the center of pressure of the cambered blade section is stable at about 25% of the chord from the leading edge of the blade, and it is contemplated according to the present invention that the chordwise location of the center of gravity of various sections of the blade should lie substantially at the same chord point as the center of pressure location, or slightly ahead of the center of pressure location. The ballast weight 25 at the leading edge of the blade, and also the location of the jet fuel feed line 33 close to the leading edge of he blade assist in establishing a sectional center of gravity location well forwardly in the blade, i.e., at least as far forward as the sectional center of pressure location.

By virtue of the plan and sectional aerodynamic characteristics of the blade described above, the progressive change in the thickness ratio, while maintaining the same mean camber line curvature, results in a blade which retains high lift coefficient at the tip region of the blade while at the same time effecting reduction in blade drag in the tip region. In consequence the efficiency of the blade is increased at high translational speeds of the aircraft or at high blade tip speeds, even approaching Mach I. Moreover the blade as described above not only attains an increased overall efficiency under conditions producing high tip speeds, but is also characterized by significant improvement in efficiency under certain other operating conditions, especially under conditions of hovering or vertical flight, and also maneuvering.

Thus the blade of the invention in characterized by significant improvement in efficiency over a broad range of operating conditions, and not merely under those conditions resulting in maximum blade tip speed.

I claim:

1. An aircraft sustaining rotor blade having a cambered airfoil section at least throughout most of the outer half of the blade radius, the mean camber line of said section being curved, said section having a substantially constant chordwise center of pressure, and the outboard region of the cambered portion of the blade being of smaller thickness ratio than the inboard region thereof, with the thickness ratio varying in the outer half of the blade radius from a thickness ratio of about 15% in the mid region of the blade to a thickness ratio of about 6% at the blade tip.

2. An aircraft sustaining rotor blade having a cambered airfoil section at least throughout most of the outer half of the blade radius, the outboard region of the cambered portion of the blade being of smaller thickness ratio than the inboard region thereof, and the mean camber line curvature of the blade section in the regions of both the larger and smaller thickness ratio being the same, and said cambered airfoil section having a substantially constant chordwise center of pressure.

3. An aircraft sustaining rotor blade having a cambered airfoil section at least throughout most of the outer half of the blade radius, the outboard region of the cambered portion of the blade being tapered in plan to provide a smaller chord in said outboard region as compared with the inboard region thereof, the outboard region of the cambered portion of the blade being of smaller thickness ratio than the inboard region thereof, and the mean camber line curvature of the blade section in the regions of both the larger and smaller thickness ratio being the same, and said cambered airfoil section having a substantially constant chordwise center of pressure.

4. An aircraft sustaining rotor blade having a substantially constant chord dimension in the radially inboard half of the blade and being tapered to a reduced chord dimension in at least most of the outer half of the blade, the blade further having a substantially constant thickness in the radially inboard half of the blade and being tapered to a reduced thickness in at least most of the outer half of the blade, and the blade being of cambered airfoil section at least throughout most of the outer half of the blade, the mean camber line curvature of said section being the same, and said cambered airfoil section having a substantially constant chordwise center of pressure throughout at least most of the outer half of the blade.

5. A rotor blade according to claim 4 in which the inboard portion of the blade of substantially constant chord is also of cambered section, with the same mean camber line curvature as the outboard portion of the blade.

6. A rotor blade according to claim 4 in which the outboard region of the cambered portion of the blade has a smaller thickness ratio than the inboard region of the cambered portion of the blade.

7. A rotor blade according to claim 4 in which the portion of the blade outboard of the portion of substantially constant chord varies in thickness ratio from a ratio of about 15% in the inboard region of said outboard portion to a ratio of about 6% at the blade tip.

8. An aircraft sustaining rotor blade having a cambered substantially constant chordwise center of pressure airfoil section at least throughout most of the outer half of the blade radius, the outboard region of the cambered portion of the blade being of smaller thickness ratio than the inboard region thereof, and the mean camber line curvature of the blade section in the regions of both the larger and smaller thickness ratio being the same and substantially conforming with the mean camber line of the NACA 230 airfoil.

References Cited
UNITED STATES PATENTS

| | | | |
|---|---|---|---|
| 2,272,439 | 2/1942 | Stanley et al. | 170—159 |
| 2,609,883 | 9/1952 | Daland | 170—159 |

EVERETTE A. POWELL, JR., *Primary Examiner.*

UNITED STATES PATENT OFFICE
CERTIFICATE OF CORRECTION

Patent No. 3,433,306                                           March 18, 1969

Paul H. Stanley

It is certified that error appears in the above identified patent and that said Letters Patent are hereby corrected as shown below:

Column 3, line 49, cancel "In the embodiment disclosed, the" and insert -- Indeed the aeroform section and --; line 69, "69-80%" should read -- 60-80% --.

Signed and sealed this 7th day of April 1970.

(SEAL)
Attest:

Edward M. Fletcher, Jr.                    WILLIAM E. SCHUYLER, JR.
Attesting Officer                                  Commissioner of Patents